Oct. 18, 1955

H. W. GILLIE 2,721,234

TELEPHONE HEAD CLAMP

Original Filed Oct. 22, 1949

Harry W. Gillie
INVENTOR.

BY Clarence A. O'Brien
and Harvey B. Jacobson
Attorneys

United States Patent Office 2,721,234
Patented Oct. 18, 1955

2,721,234

TELEPHONE HEAD CLAMP

Harry W. Gillie, Akron, Ohio

Substituted for abandoned application Serial No. 122,923, October 22, 1949. This application November 23, 1953, Serial No. 393,584

7 Claims. (Cl. 179—156)

This invention relates to an attachment for a telephone and more particularly to a telephone head clamp adapted to be used in connection with the "French" type telephone, and is a substitute for the abandoned application Serial No. 122,923, filed October 22, 1949, for Telephone Head Clamp.

The primary object of this invention resides in the provision of means for supporting the handset of a telephone in intimate engagement with the ears of the user and with the mouthpiece thereof in proper position whereby the person using the telephone can utilize his hands for other purposes besides that of holding the telephone handset while using the telephone.

A further object of the invention resides in the provision of means attachable to the telephone handset which includes a headband adapted to be positioned on the user's head when it is desired to suspend the telephone from the user, but which handband may be pivoted out of the way so that the handset can be utilized in the conventional manner.

Still further objects and features of this invention reside in the provision of a telephone head clamp that is strong and durable, simple in construction and manufacture, capable of being used for an extended period of time without any discomfort to the user and which may be readily adjusted for ready convenience and comfort to the user.

These, together with the various ancillary objects and features of the invention which will become apparent as the following description proceeds, are attained by this telephone head clamp, a preferred embodiment of which has been illustrated in the accompanying drawings, by way of example only, wherein.

Figures 1, 2, 3:
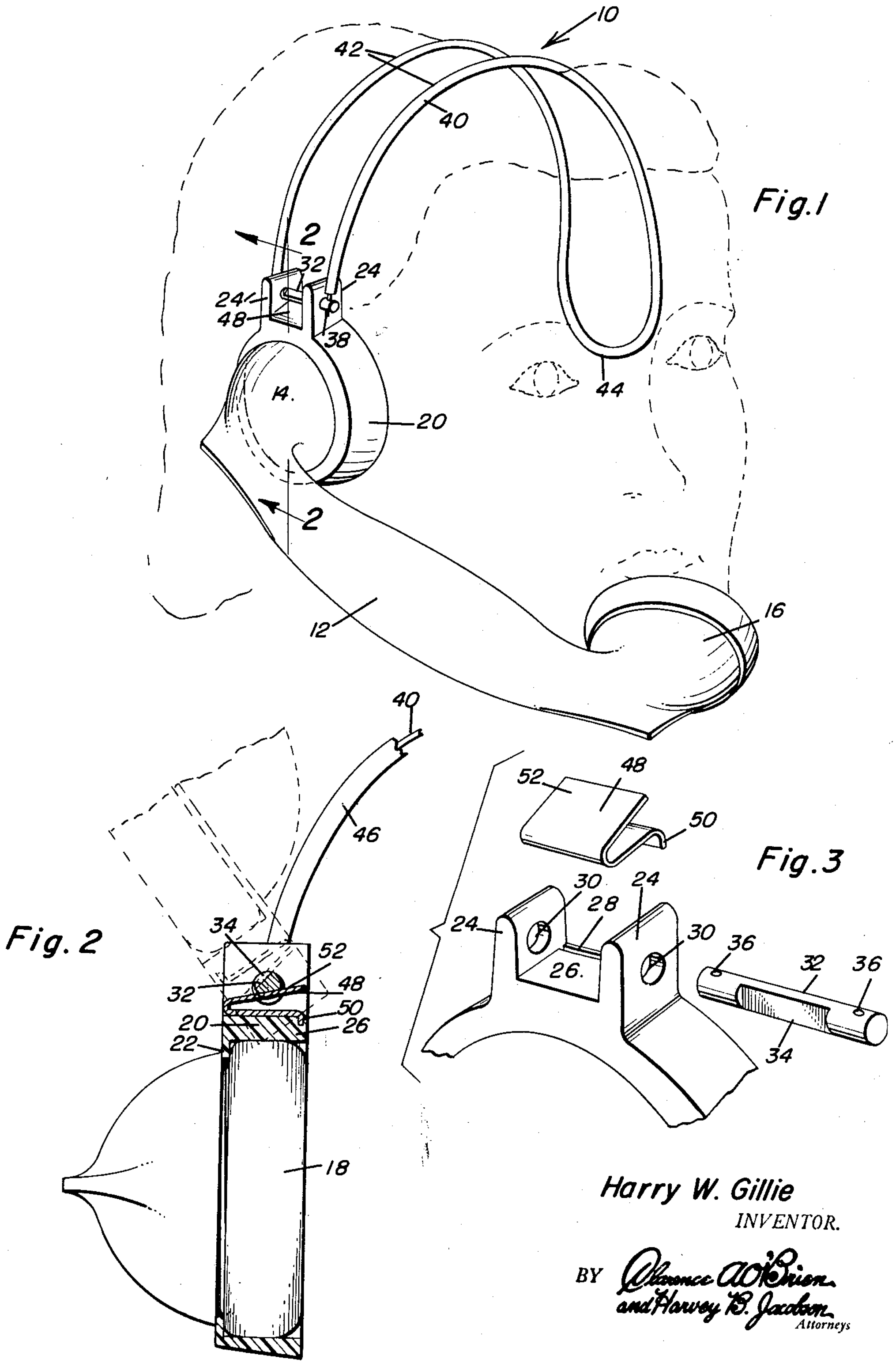
Figure 1 is a perspective view illustrating the manner in which the telephone head clamp is utilized in connection with the handset of a telephone.
Figure 2 is a vertical sectional view as taken along the plane of line 2—2 in Figure 1; and, Figure 3 is an exploded perspective view illustrating the construction.

With continuing reference to the accompanying drawings wherein like reference numerals designate similar parts throughout the various views, reference numeral 10 generally designates the telephone head clamp comprising the present invention which is adapted to be utilized in connection with a conventional telephone handset 12 provided with the commonly used "French" type telephone. The handset 12 is provided with an earpiece 14 and a mouthpiece 16 as is conventional. The earpiece 14 has of course a threaded removable section 18 which is provided so that access may be had to the interior mechanism of the earpiece 14 when it is necessary to repair or service such elements. The telephone head clamp includes a ring 20 having a flange 22 integrally formed therewith, the ring 20 being preferably molded out of any suitable synthetic plastic material or the like. The ring 20 is adapted to be clampingly held in position by the threaded detachable member 18 clampingly engaging the flange 22. Hence, the ring 20 may be rotated relative to the handset 12 clampingly held in position by the removable portion 18.

Also being integrally formed therewith are studs or risers 24 which are spaced from each other and between which the ring 20 is provided with a second thickened portion 26 provided with a slot 28 therein. The studs 24 have apertures or bores 30 extending therethrough for receiving an eccentrically ground shaft 32 provided with cam surfaces 34 opposed to the thickened portion 26. The shaft 32 is also apertured as at 36 for reception of the ends 38 of a headband 40 having spaced arcuate portions 42 interconnected by an end connecting portion 44 remote from the shaft 32. The headband 40 is formed from a single strand of wire coated with a resilient material such as rubber or the like to add to the comfort of the wearer. The ends 38 of the headband 40 lock the shaft 32 in the studs 24. A spring 48 having an end portion 50 is provided and the end portion 50 extends into the slot 28 with the upper surface 52 of the spring engaging the cam surfaces 34 on the eccentric shaft 32. The cam surfaces 32 are such that two substantially flat surfaces are formed whereby the ring 20 may be rotated relative to the headband from the position as is shown by the solid lines in Figure 2 to the position as is shown in the phantom lines in Figure 2. Thus, the headband 40 can alternatively be utilized as a support for the telephone handset 12 or may be rotated out of position so that the handset 12 may be utilized in the conventional manner. The cam surfaces 34 insure a snap action so that the intermediate position will be an unstable position and that the headband 40 will clampingly lock in the two defined positions.

Since from the foregoing the construction and advantages of this telephone head clamp are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft.

2. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said resilient headband including a pair of spaced arcuate portions interconnected by a connecting portion remote from said shaft, the ends of said arcuate portions being secured to said shaft.

3. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said headband comprising a single length of wire having a covering of resilient material.

4. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said resilient headband including a pair of spaced arcuate portions interconnected by a connecting portion remote from said shaft, the ends of said arcuate portions being secured to said shaft, said headband comprising a single length of wire having a covering of resilient material.

5. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said ring having an inwardly extending peripheral flange for holding said ring on said telephone handset.

6. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said ring having an inwardly extending peripheral flange for holding said ring on said telephone handset, said resilient headband including a pair of spaced arcuate portions interconnected by a connecting portion remote from said shaft, the ends of said arcuate portions being secured to said shaft.

7. A telephone head clamp comprising a ring adapted to fit over the earpiece of a telephone handset, said ring having a pair of spaced studs integrally formed therewith and having a thickened portion between said studs, a slot in said thickened portion, an eccentric shaft journaled in said studs, a spring engaged in said slot resiliently engaging said eccentric shaft, and a resilient headband secured to said shaft, said ring having an inwardly extending peripheral flange for holding said ring on said telephone handset, said resilient headband including a pair of spaced arcuate portions interconnected by a connecting portion remote from said shaft, the ends of said arcuate portions being secured to said shaft, said headband comprising a single length of wire having a covering of resilient material.

References Cited in the file of this patent

UNITED STATES PATENTS

| | | |
|---|---|---|
| 2,481,387 | Bonecutter | Sept. 6, 1949 |
| 2,487,787 | Brown | Nov. 15, 1949 |
| 2,538,458 | Hutchinson | Jan. 16, 1951 |